(12) United States Patent
Ogawa

(10) Patent No.: US 11,004,306 B2
(45) Date of Patent: May 11, 2021

(54) VIRTUAL MONEY MANAGEMENT SYSTEM AND METHOD

(71) Applicant: Akatsuki Inc., Tokyo (JP)

(72) Inventor: Tomoya Ogawa, Tokyo (JP)

(73) Assignee: Akatsuki Inc., Tokyo (JP)

( * ) Notice: Subject to any disclaimer, the term of this patent is extended or adjusted under 35 U.S.C. 154(b) by 0 days.

(21) Appl. No.: 16/306,107

(22) PCT Filed: May 26, 2017

(86) PCT No.: PCT/JP2017/019674
§ 371 (c)(1),
(2) Date: Nov. 30, 2018

(87) PCT Pub. No.: WO2017/208989
PCT Pub. Date: Dec. 7, 2017

(65) Prior Publication Data
US 2019/0172313 A1    Jun. 6, 2019

(30) Foreign Application Priority Data
Jun. 1, 2016 (JP) .............................. JP2016-110162

(51) Int. Cl.
*G07F 17/32* (2006.01)
*A63F 13/61* (2014.01)
(Continued)

(52) U.S. Cl.
CPC .......... *G07F 17/3251* (2013.01); *A63F 13/30* (2014.09); *A63F 13/35* (2014.09);
(Continued)

(58) Field of Classification Search
CPC ............. G07F 17/3251; G07F 17/3255; G07F 17/3281; G07F 17/3288; G07F 17/32593;
(Continued)

(56) References Cited

U.S. PATENT DOCUMENTS 5,470,079 A    11/1995  LeStrange et al.
8,360,873 B1 *  1/2013  Wickett ................. G06F 16/27
                                                   463/29
(Continued)

FOREIGN PATENT DOCUMENTS

JP    H08-180115 A    7/1996
JP    2002-219281 A    8/2002
(Continued)

OTHER PUBLICATIONS

International Search Report of PCT/JP2017/019674.
(Continued)

*Primary Examiner* — Michael A Cuff
(74) *Attorney, Agent, or Firm* — Muncy, Geissler, Olds & Lowe, P.C.

(57) ABSTRACT

A system and the like are provided, which increase user enjoyment in a plurality of types of games through management of a plurality of types of money. A virtual money management system includes: a gaming server which can be accessed by a plurality of user terminals and controls a multiplayer game played by the plurality of user terminal accessing; and a management server which manages virtual money bet in the multiplayer game, wherein the gaming server operates a plurality of types of multiplayer games, and the management server (A) manages different types of virtual money used in the plurality of types of multiplayer games, respectively, (B) performs exchange processing for exchanging the different types of virtual money with each other, and (C) in at least one type of multiplayer game among the plurality of types of multiplayer games, grants rewards to players based on reward values defined according to rankings in the game.

6 Claims, 14 Drawing Sheets

(51) Int. Cl.
*A63F 13/792* (2014.01)
*A63F 13/30* (2014.01)
*A63F 13/80* (2014.01)
*A63F 13/35* (2014.01)

(52) U.S. Cl.
CPC ............ *A63F 13/61* (2014.09); *A63F 13/792* (2014.09); *A63F 13/80* (2014.09); *G07F 17/3255* (2013.01); *G07F 17/3281* (2013.01); *G07F 17/3288* (2013.01); *G07F 17/3293* (2013.01)

(58) Field of Classification Search
CPC .......... A63F 13/30; A63F 13/35; A63F 13/61; A63F 13/80; A63F 13/85
USPC .......................................................... 463/25
See application file for complete search history.

(56) References Cited

U.S. PATENT DOCUMENTS

| | | | |
|---|---|---|---|
| 9,626,475 B1* | 4/2017 | Schultz | A63F 13/69 |
| 10,497,220 B2* | 12/2019 | Simons | G07F 17/3295 |
| 2004/0148221 A1* | 7/2004 | Chu | A63F 13/12 |
| | | | 705/14.51 |
| 2006/0128453 A1 | 6/2006 | Hoffman | |
| 2006/0148567 A1* | 7/2006 | Kellerman | G07F 17/32 |
| | | | 463/42 |
| 2008/0140528 A1* | 6/2008 | Ganz | A63F 13/12 |
| | | | 705/14.12 |
| 2009/0048918 A1* | 2/2009 | Dawson | A63F 13/10 |
| | | | 705/14.26 |
| 2009/0082113 A1 | 3/2009 | Kim et al. | |
| 2010/0016069 A1* | 1/2010 | Herrmann | G07F 17/32 |
| | | | 463/25 |
| 2010/0125524 A1* | 5/2010 | Liang | G06Q 20/401 |
| | | | 705/75 |
| 2012/0157211 A1* | 6/2012 | Kane | A63F 13/10 |
| | | | 463/42 |
| 2015/0087371 A1* | 3/2015 | Hill | G07F 17/3223 |
| | | | 463/11 |
| 2015/0352447 A1 | 12/2015 | Ishida et al. | |

FOREIGN PATENT DOCUMENTS

| | | |
|---|---|---|
| JP | 2002-245321 A | 8/2002 |
| JP | 2003-76851 A | 3/2003 |
| JP | 2005-173827 A | 6/2005 |
| JP | 2006-293474 A | 10/2006 |
| JP | 2009-540423 A | 11/2009 |
| JP | 2012-113445 A | 6/2012 |
| JP | 2014-030515 A | 2/2014 |
| WO | 2014/112647 A1 | 7/2014 |

OTHER PUBLICATIONS

Rules of the casino game, and Ameba Pigg Staffs [online], Aug. 17,2010, [searched on Dec. 23, 2020], the Internet <URL:https://ameblo.jp/pigg - staff/entry-10617685605.html> and English partial translation thereof.

Office action for the corresponding JP application No. 2018-520863 dated Jan. 12, 2021 and machine translation thereof.

* cited by examiner

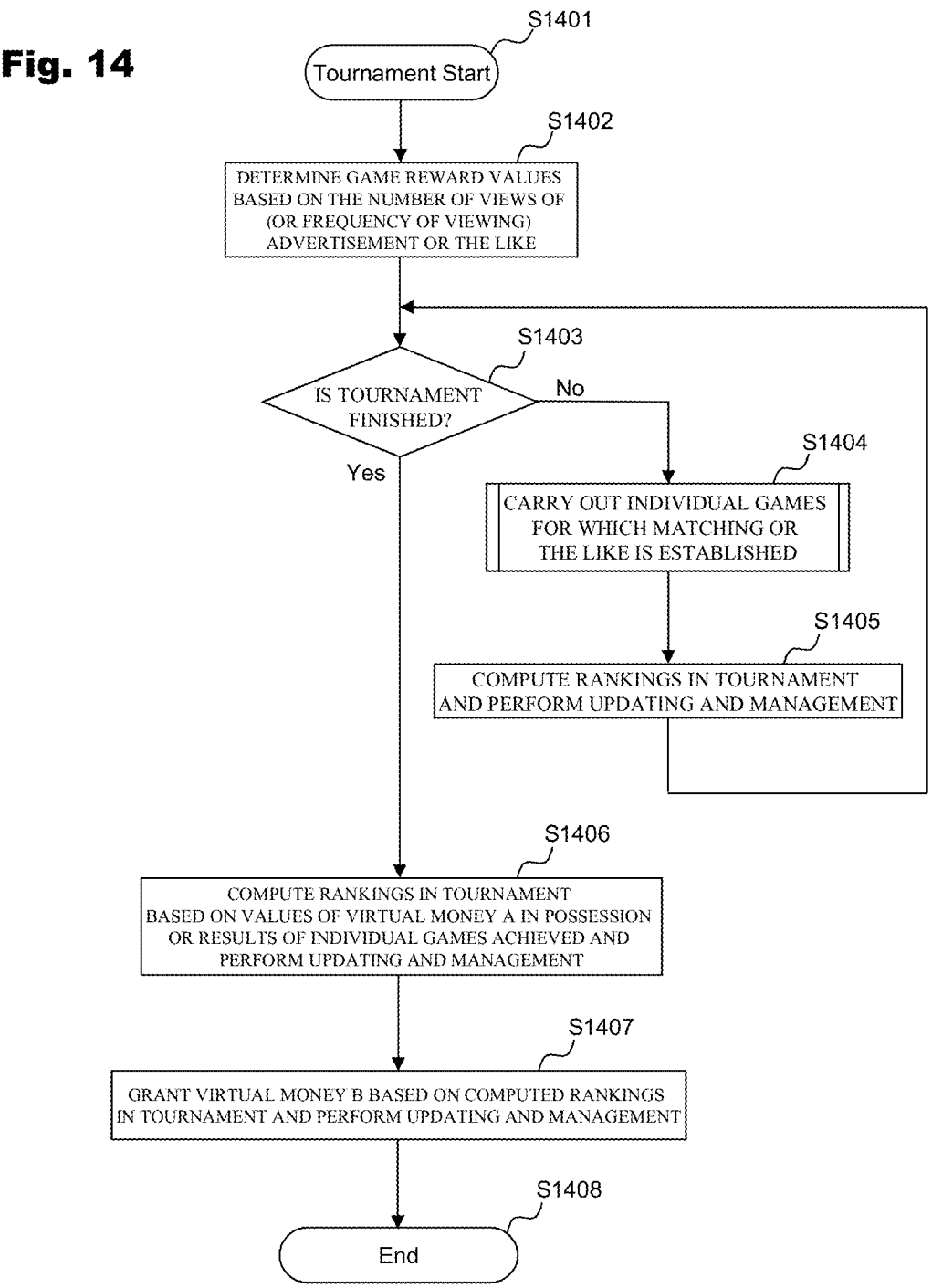

VIRTUAL MONEY MANAGEMENT SYSTEM AND METHOD

TECHNICAL FIELD

The present invention broadly relates to a system, a method, a program, and the like which manage virtual money via a network and, more specifically, to a system or the like which expedites proceedings of a game or the like and at the same time manages virtual money via a network.

BACKGROUND ART

Conventionally, so-called multiplayer games that can be played by multiple players have been operated via a network. In such events, there are some games in which betting is possible in proceedings of the games, and virtual money circulating online has been used for an object of betting.

In recent years, many types of money and credit are in circulation online, and techniques for system operation involving such money and credit have been devised.

First, a system has been proposed, which can deal with all types of money, tokens, credit, and the like that can be used on gaming machines that are not limited to network games, and which can provide accurate gaming machine accounting data (Patent Literature 1).

That is, Patent Literature 1 discloses an accounting and data collection system for a gaming machine adapted to accept game credit purchases and wagers from a player using one or more forms of monetary value, to generate game winnings or losses in response thereto and to dispense available game credit collected by the player in one or more forms of monetary value, comprising: means for storing the amount of residual game credit purchased corresponding to credit purchased which has not yet been risked by the player; means for tracing game activity within said gaming machine including the total wagers accepted and the total winnings paid to the players of said gaming machine; and event processing means for sensing gaming machine events including the amount and form of game credit purchase and the amount of a wager by the player and having means for updating said residual credit storing means when game credit is purchased, when a wager is placed and when credit is collected by the player and incrementing said game activity tracing means by the amount of credit collected in excess of the amount of residual credit available to the player.

Moreover, a virtual store system has also been proposed, in which it is possible to differently use virtual currency (first currency or town currency) that can be used in a whole virtual space (town) on a network and virtual currency (second currency or game currency) that can be used only at a predetermined game store (where a game application is offered) within the virtual space (Patent Literature 2).

That is, Patent Literature 2 discloses a virtual store system including a terminal, accounting means, and service provision means that are connected to a network, wherein a user accesses a virtual space from the terminal and uses a service at a virtual store installed in the virtual space, wherein the accounting means includes an accounting database for managing first currency that can be used in the virtual space, and the service provision means includes a service database for managing second currency that can be used only at the virtual store provided by the service provision means.

CITATION LIST

Patent Literature

Patent Literature 1: Japanese Patent Laid-Open No. 8-180115
Patent Literature 2: Japanese Patent Laid-Open No. 2006-293474

SUMMARY OF INVENTION

Technical Problem

However, although the conventional money management methods can enhance flexibility in system operation by dealing with a plurality of types of currency and the like used in games or by using different types of currency in different games or services, there is a room for improvement in order for many users to have greater enjoyment in a plurality of types of games through management of a plurality of types of money possessed by the users.

Even for a same type of game in which match-ups are played, a further improvement is expected, for example, in terms of increasing enjoyment through management and operation of a plurality of events on a system.

Solution to Problem

Accordingly, a virtual money management system according to an embodiment of the present invention is a virtual money management system including: a gaming server which can be accessed by a plurality of user terminals and controls a multiplayer game played by the plurality of user terminals accessing the gaming server; and a management server which manages virtual money bet in the multiplayer game, wherein the gaming server operates a plurality of types of multiplayer games, and the management server (A) manages different types of virtual money used in the plurality of types of multiplayer games, respectively, (B) performs exchange processing for exchanging the different types of virtual money with each other, and (C) in at least one type of multiplayer game among the plurality of types of multiplayer games, grants rewards to players based on reward values defined according to rankings in the game.

The plurality of types of multiplayer games include at least a specific type of card game and a tournament of the specific type of card game.

The specific type of card game is always held, and the tournament of the specific type of card game is held for a limited time period.

Advantageous Effects of Invention

The virtual money management system and the like according to the embodiment of the present invention bring about a particular effect that enjoyment of a plurality of users in a plurality of types of games can be enhanced through management of a plurality of types of money possessed by the users, whereby it is possible to achieve increasing enjoyment through management and operation of a plurality of events on a system.

BRIEF DESCRIPTION OF DRAWINGS

FIG. 14 is a flowchart for explaining other operations of the virtual money management system and the like according to the embodiment of the present invention.

DESCRIPTION OF EMBODIMENTS

A virtual money management system, a method, and a program according to an embodiment of the present invention will be described in detail with reference to drawings.

Figure 1:
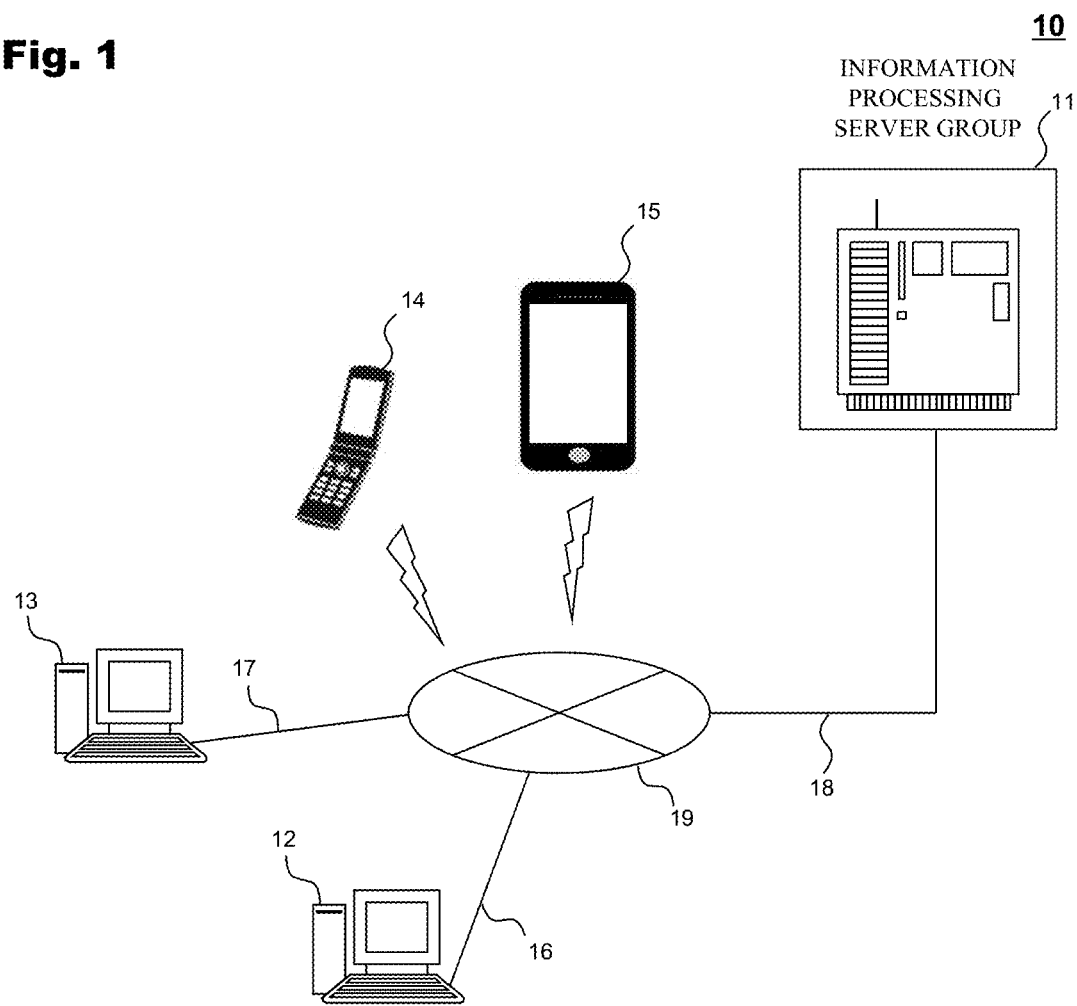
FIG. 1 is an explanatory diagram for explaining an example of an entire configuration of a virtual money management system according to an embodiment of the present invention.

FIG. 1 shows an example of an entire configuration of the virtual money management system according to the embodiment of the present invention. Characteristic processing operations of the present invention are performed mainly through coordination of a management server (which manages virtual money) and a gaming server (which manages and operates a game) in an information processing server group. However, the present invention is not limited to this. The management server and the gaming server may be implemented on a single server (in which case, management server functionality and gaming server functionality as software are implemented on a single server). Alternatively, at least part of executable processing routines may also be executed by another information processing server, another information processing apparatus, and the like in some cases. Hereinafter, a description will be given of an aspect of carrying out the embodiment of the present invention as the entire virtual money management system, with reference to FIG. 1.

As shown in FIG. 1, the virtual money management system 10 includes, as minimum components, an information processing server group 11 (including a management server which manages virtual money and a gaming server which manages and operates a game) and various information processing apparatuses used by players (in FIG. 1, PCs 12 and 13, a mobile telephone 14, and a mobile information terminal or tablet terminal 15 are depicted as examples, which will be collectively referred to as "user terminals" hereinafter), and the server group and the various terminals are communicably connected to each other through a dedicated circuit or a public circuit such as the Internet (16 to 18, which are wired circuits) as shown in FIG. 1. The circuits may be wired or wireless. In the case of wireless, the mobile telephone 14 and the mobile information terminal or tablet terminal 15 are wirelessly connected to the Internet 19 via a base station (not shown), a wireless router (not shown), and the like and are further mutually communicably connected to the information processing server group 11 through the circuit 18.

Note that many mobile telephones and mobile information terminals or tablets as of the filing date of the present application have throughput (communication processing rate, image processing capacity, and the like) comparable to that of personal computers (PCs) and are nothing less than small computers.

Moreover, a program or software necessary to carry out the present invention is generally installed or stored into storage sections of the information processing server group and further into an HDD, an SDD, or the like in a storage section of each PC or each mobile information terminal as necessary. When the program or the software is executed, all of the program or the software, or part thereof as a software module, is read into a memory in the storage section as necessary, and operations are executed by a CPU.

Note that the operations do not necessarily need to be performed by a central processing section such as the CPU. An auxiliary operational device such as a digital signal processor (DSP) (not shown) can also be used.

Further, for a hardware configuration of the information processing server group 11, basically, PCs can be used. Note that to increase hardware performance of the information processing server group 11 when necessary, the information processing server group 11 can also have a configuration suitable for processing of mass data by running a plurality of PCs (as an example, several tens to several tens of thousands of PCs) in parallel, although the present invention is not limited to this.

Figure 2:
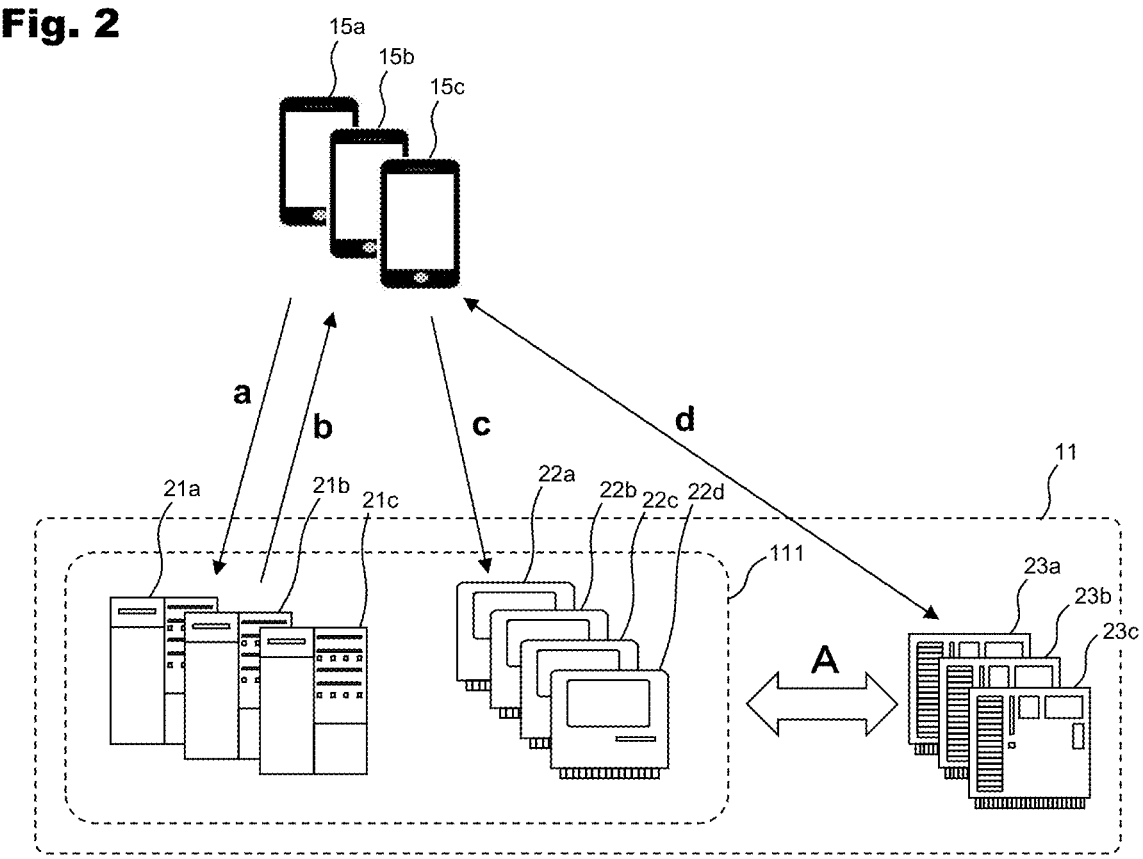
FIG. 2 is an explanatory diagram for explaining the virtual money management system according to the embodiment of the present invention in more detail.

FIG. 2 shows a more detailed system configuration of the information processing server group 11 according to the embodiment of the present invention. Operations of the information processing server group 11 are implemented through individual operations of hardware and coordinated operations of software and the hardware, which will be described below.

Referring to FIG. 2, the information processing server group 11 accessed by tablet terminals 15a to 15c as an example of user terminals broadly includes a game operation server group 111 and (a group of) management servers 23a to 23c. In more detail, the game operation server group 111 includes a group of matching servers 21a to 21c and gaming clusters 22a to 22d.

Note that a plurality of components denoted with letters such as the "user terminals 15a to 15c" and the "group of matching servers 21a to 21c" are intended to indicate a possibility that these components can be many terminals or a group of servers (clusters), and do not limit the numbers of the components (three from a to c, four from a to d, only one, and the like).

Here, the (group of) matching servers are (a group of) servers in charge of user matching processing and the like in a lobby in order to establish a real time multiplayer game, while the (group of) gaming servers are (a group of) servers in charge of real time communication processing and the like to expedite a proceeding of a multiplayer game in real time.

In FIG. 2, data exchanges between the server group 11 and the user terminals 15 and data exchanges between the clusters are represented by two-way or one-way arrows a to d and an arrow A, respectively, which are summarized in a table below (details will be described later with reference to FIG. 5 and others).

TABLE 1

| Arrow | Phase where data exchange occurs |
|---|---|
| a | When connecting to a Lobby for matching |
| b | When returning room_id for playing a multiplayer game |
| c | When connecting to Game_server with a node/room designated |
| d | Any timing including timings other than during game proceeding (e.g., before the game is started and after the game is finished) |
| A | Any timing during game proceeding, an interval between games, or the like |

Figure 3:
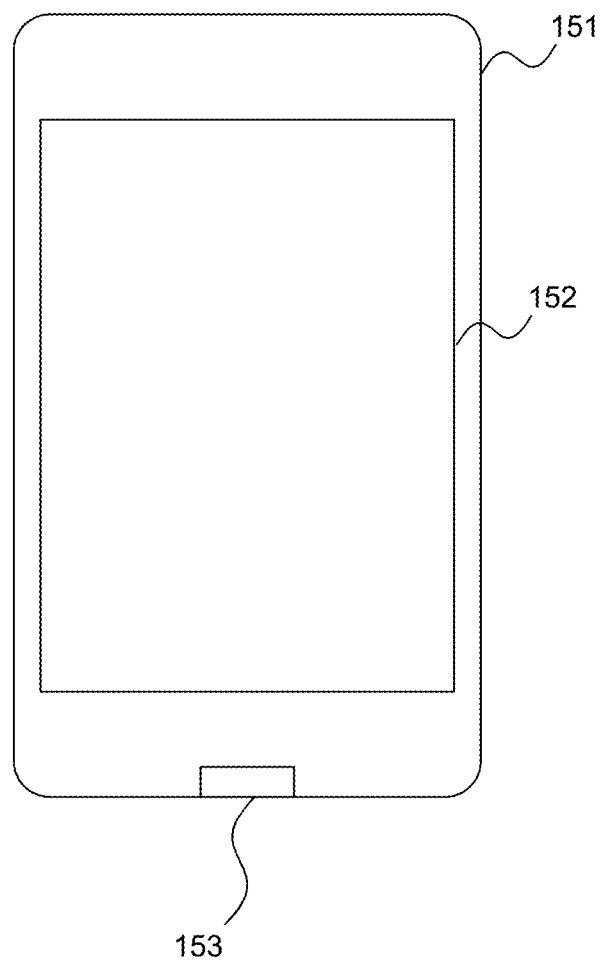
FIG. 3 is an explanatory diagram for explaining an outer configuration of an information processing apparatus in the virtual money management system according to the embodiment of the present invention.

FIG. 3 shows an outer configuration of a tablet terminal as an information processing apparatus in the virtual money management system according to the embodiment of the present invention. Referring to FIG. 3, the information processing apparatus (tablet terminal) 15 includes a housing section 151, a display 152, and a hardware button 153 provided at a lower center portion of the housing section 151. The display 152 is typically configured with a liquid crystal display (LCD) or the like and can display various information such as text, a still image, and a video. Moreover, an instruction (command) to the tablet terminal 15 can be made by causing the display 152 to display a menu button or a software keyboard and touching the menu button or the software keyboard with a finger, a stylus (not shown), or the like. In this light, the above-mentioned hardware button 153 is not an essential component. However, for the purpose of facilitating a description of the present invention, the hardware button 153 is mounted as a button for providing specific functions. Needless to say, the hardware button 153 can also be substituted by a menu button displayed on part of the display 152.

The display 152 includes a multi-touch input panel, and a touch input location coordinate on the touch input panel is transmitted via an input device interface (not shown) to and processed by a processing system (CPU) of the tablet terminal 15. The multi-touch input panel is configured to be able to sense a plurality of contact points on the panel at the same time. This sensor can be implemented by various methods. The sensor is not necessarily limited to a contact sensor but, for example, can be implemented by using an optical sensor to extract instruction points on the panel. Apart from the contact sensor and the optical sensor, a capacitive sensor configured to sense human skin contact can also be used.

The tablet terminal 15 may also include a microphone and a speaker, which are not depicted in FIG. 3. In this case, voice of the user or the like picked up by the microphone can also be used for an input command through recognition. Further, a camera device such as a CMOS, which is not depicted in FIG. 3, is mounted on a back or the like of the tablet terminal 15.

Figure 4:
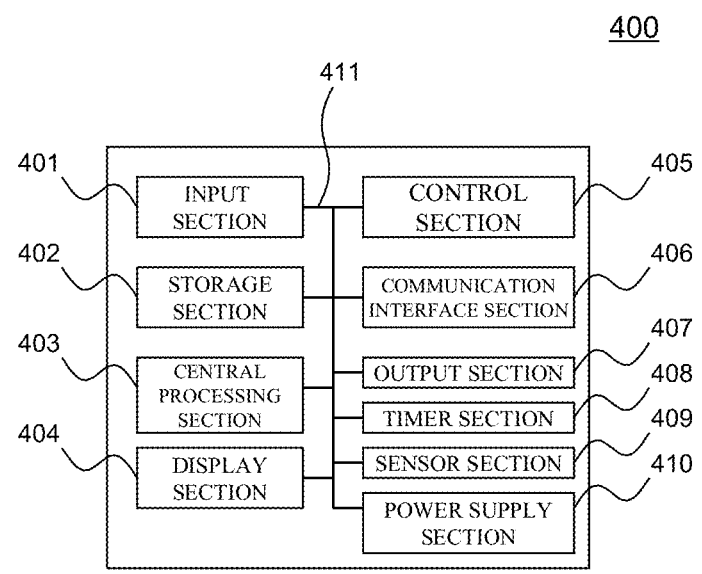
FIG. 4 is an explanatory diagram for explaining functional blocks of the information processing apparatus in the virtual money management system according to the embodiment of the present invention.

FIG. 4 shows hardware functional blocks included in the tablet terminal 15 according to the embodiment of the present invention, as an example. Operations of the tablet terminal 15 are implemented through individual operations of hardware and coordinated operations of software and the hardware, which will be described below.

Referring to FIG. 4, a tablet terminal 400 as a whole of the hardware blocks broadly includes: an input section 401 including the hardware button 153 shown in FIG. 3, the multi-touch input panel provided to the display 152, the microphone, and the like; a storage section 402 including a hard disk for storing programs, data, and the like, a RAM and/or a ROM, and the like; a central processing section 403 configured with a CPU which performs various numerical calculations and logical operations through programs; a display section 404 including the display 152 and the like; a control section 405 for controlling a chip, an electrical system, and the like; a communication interface section 406 including a slot for accessing the Internet, a port for optical communication, and a communication interface; an output section 407 including a speaker, a vibrator, and the like; a timer section 408 for measuring a time of day and the like; a sensor section 409 configured with an image sensor such as a CMOS; and a power supply section 410 for supplying power to each module in the apparatus. These modules are appropriately connected through a communication bus and a power line (which are collectively represented by a connecting line 411, which is appropriately branched into individual lines, in FIG. 4 for convenience) as necessary.

Note that the sensor section 409 may include a GPS sensor module for locating the tablet terminal 400 (15). A signal detected by the image sensor such as a CMOS included in the sensor section 409 can be processed as input information by the input section 401.

The program or the software necessary to carry out the present invention is generally installed or stored into the hard disk or the like included in the storage section 402. When the program or the software is executed, all of the program or the software, or part thereof as a software module, is read into a memory in the storage section 402 as necessary, and operations are executed by the CPU 403.

Note that the operations do not necessarily need to be performed by the central processing section 403 such as the CPU. An auxiliary operational device such as a digital signal processor (DSP) (not shown) can also be used.

Next, a description will be given of operations of the virtual money management system or the virtual money management program according to the embodiment of the present invention, by using an operational flow shown in FIG. 5.

The characteristic operations of the present invention can be carried out mainly by the information processing server group, and at least part of the characteristic operations can also be carried out by the information processing apparatus and the like, as mentioned already.

Figure 5:
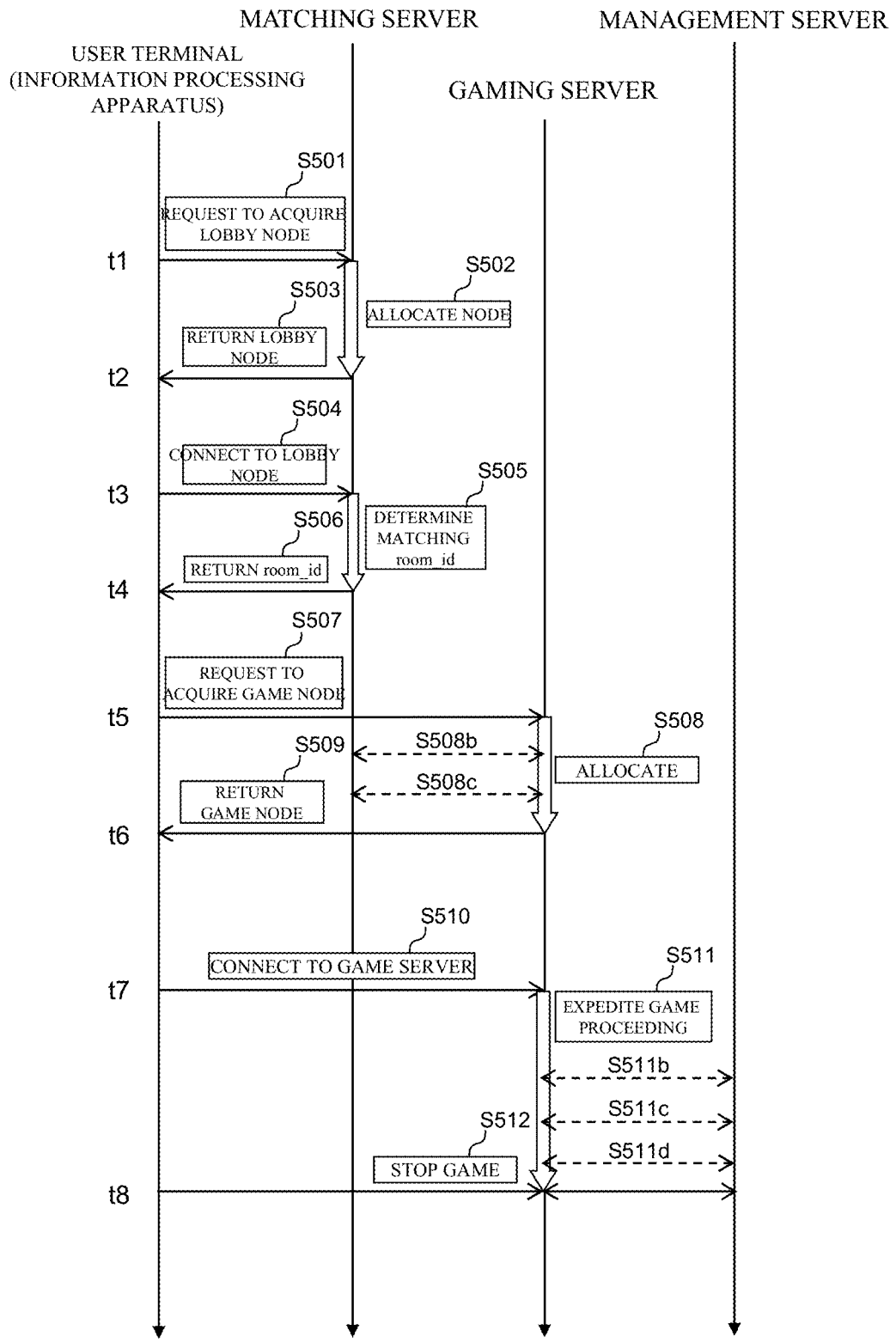
FIG. 5 is an explanatory diagram for explaining an example of operations of the virtual money management system and the like according to the embodiment of the present invention.

The "user terminal" in FIG. 5 is the information processing apparatus, which corresponds to the tablet terminal 15 in FIG. 1 as well as any of the PCs 12 and 13, the mobile telephone 14, and the like in FIG. 1. The "matching server", the "gaming server", and the "management server" in FIG. 5 correspond to the information processing server group 11 in FIG. 1. In more detail, the "matching server", the "gaming server", and the "management server" in FIG. 5 correspond to one or more servers among the matching servers 21a to 21c, one or more servers among the gaming servers 22a to 22d, and one or more servers among the management servers 23a to 23c in FIG. 2, respectively.

Moreover, in FIG. 5, t1 to t8 show a flow of a time series, along which operations and processing described below are performed over time.

(Processing Before Time t1)

First, processing before time t1 (not shown in FIG. 5) will be briefly described. Before time t1, a user (player) downloads from any one server in the information processing server group, via the user terminal, application software for causing their own user terminal to operate as an information processing apparatus in the information processing system according to the present invention. This application software is client software or application software for processing at least part of the program according to the present invention. The downloaded application software is installed into the user terminal.

Note that the application software can also be substituted by a function of web browser preinstalled in the information processing apparatus, in which case the installation of the application software may be omitted in some cases.

From the user terminal, a mail address of the user and also profile information as in a table below as an example can be uploaded to a server for user registration as necessary to allow the server to register and manage such information.

Note that the terminal can transmit a command (for example, an operation command for betting or operating an object while the game application is being executed by one player, or the like) at any time, and each time the server receives the command from the terminal, the server can provide a service (for example, upon receiving the operation command while the game application is being executed, the server moves the operation-target object such as a card, or performs other arithmetic processing or the like).

Additionally, as an example, the user (player) can also transmit a message to a specified counterpart or a large number of specified counterparts from the user terminal. This message is relayed by the information processing server and forwarded and received by the specified counterpart or the large number of specified counterparts. The transmitted message can also be checked on their own terminal. Such a communication tool is so-called an option and can be included as necessary.

The foregoing is an example of the operations before time t1. After time t1, an example of operations mainly involving multiplayers will be described. Required processing for the operations involving multiplayers includes player matching processing and multiplayer game proceeding processing by the multiplayers.

(Processing After Time t1)

At time t1 in FIG. 5, processing for acquiring a Lobby node from the matching server by the user terminal is performed (step S501 to step S503). That is, triggered by a Lobby node acquisition request from the user terminal (step S501), processing for allocating the matching server (or a Lobby in the matching server) to be used by the user terminal is performed. The matching server performs pro-

TABLE 2

| Name (Nickname) | Membership number (ID) | Mail address (Mobile number) | Gender | Age (Age in decades) | Area of residence | Hobby (Preference) |
| --- | --- | --- | --- | --- | --- | --- |

Data items as described above are stored as user data in any one server in the information processing server group. Then, the user (player) can start a game by operating the information processing apparatus.

When starting the game, as an example, the user (player) performs two typical user terminal operations, namely, a login action and command transmission, to receive necessary data transmission, or to receive service provision, from an information processing server.

More specifically, when the user performs processing for logging in to the server via their own information processing apparatus, the information processing server appropriately performs necessary authentication processing and transmits data to allow the user to receive service provision. For example, the data is a top menu screen, an application activation screen, or the like configured to receive a command from the terminal.

Then, the user transmits a command via the information processing apparatus. This command may be a selected option in a menu displayed on the menu screen or, in the case of the application activation screen, may be a start command to start an application. Upon receiving the command, the server side starts processing for a service. Then, the service responding to a request from the terminal is provided from the server.

cessing for arrangement responding to the request and, at time t2, returns a secured Lobby node to the user terminal (step S503).

In this example, the Lobby node acquisition request in step S501 is positioned as a "trigger for requesting to start a multiplayer game" or an "access request" for a multiplayer game.

Next, at time t3, Lobby node connection is performed from the user terminal to the matching server (step S504). A connection destination is the Lobby node returned in step S503.

From time t3 to time t4, the matching server determines a room_id for a match-up of users (step S505), and at time t4, the determined room_id is returned from the matching server to the user terminal (step S506).

Next, at time t5 in FIG. 5, processing for acquiring a Game node from the gaming server by the user terminal is performed (step S507 to step S509). That is, triggered by a Game node acquisition request from the user terminal (step S507), processing for allocating the gaming server (or a game instance including a Game node in the single gaming server) to be used by the user terminal is performed (step S508). At this time, the gaming server can appropriately exchange data with the matching server as necessary (as an example, step S508b to step S508c), and as a result of arrangement between the gaming server and the matching server, at time t6, the acquired Game node is returned to the user terminal (step S509).

Next, at time t7, Game node connection is performed from the user terminal to the gaming server (step S510). A connection destination is the Game node returned in step S509.

When the Game node connection succeeds, each user connected to this Game node can start a multiplayer game by using their own user terminal (it is not shown in FIG. 5 how the game is started). Typically, the multiplayer game is a card game such as poker that can be played by multiplayers in real time.

While the game is proceeding on the gaming server (step S511), data is appropriately exchanged with the management server as necessary. For example, the data is involved in processing for requesting a bet, management processing for increasing or decreasing points or chips due to a bet, and the like during the card game that can be performed by multiplayers in real time (as an example, step S511b to step S511d).

[Examples of Real-Time Multiplayer Game]

The present invention employs, but is not limited to, any of card games such as poker, blackjack, baccarat, and Texas hold 'em for a real-time multiplayer game. According to general game rules, poker is a card game in which cards are exchanged one time, each player aims to construct a highest-ranking hand possible using five cards, and a player who constructs the highest-ranking hand acquires bet chips. Blackjack is a famous card game in which a player whose total points of cards is 21 or closer to 21 than a dealer wins (provided, however, that the player loses if the total points exceed 21). Baccarat is a card game in which a hand wins if the last digit of a sum of two or three cards is closest to nine. In general, it is also possible to enjoy the game by estimating and betting on which of a player and a banker wins, not directly playing the game by using cards. Texas hold 'em is a card game in which players each have two cards of their own dealt and compete to construct a higher-ranking hand by combining their own cards with five cards called community cards available to all the players.

Hereinafter, a description will be given of operations as an example when proceeding of "Texas hold 'em" is expedited on the system including the gaming server.

(S1) A player to the left of an administrator or an NPC (Non Player Character) who acts as a dealer (a role serving as a parent who deals cards) (the position of each player is assigned on the system and can be identified by a layout being displayed on the user terminal of each player) posts a small blind (which always needs be posted when a game is started). Next, a player to the left of the small blind (the positions are managed on the system) posts a big blind (which is a bet twice the small blind to be made by a person to the left of the small blind and always needs be posted when a game is started).

(S2) The dealer deals two cards to each player in such a manner that pictures or patterns on the cards are unseen (it is recognizably displayed on a screen of the user terminal of each player that the cards are dealt, which is not shown in a figure). The remaining cards are set aside as a deck in such a manner that pictures or patterns on the cards are unseen (the remaining cards are displayed on the screen as a deck, which is not shown in a figure).

(S3) The players perform an operation for betting or the like in turn (counterclockwise), starting with a player to the left of the big blind. As an example, each player performs any one of "betting (betting chips)", "checking (betting no chips)", "calling (betting as many chips as a previous player", "raising (betting more chips than a previous player)", and "folding (withdrawing from the game)". Such operations and processing have been implemented on conventional match-up network card games, and therefore a description of detailed processing will be omitted.

(S4) If two or more players do not fold, the game progresses to a next round (S5).

(S5) The dealer places three community cards face up in a center (this is called "flop"). Each player considers how to make a hand by combining their own two cards with the community cards.

(S6) The players perform an operation for betting or the like in turn (counterclockwise), starting with the player to the left of the big blind. As an example, each player performs any one of "betting", "checking", "calling", "raising", and "folding". If all players except one fold, the player who does not fold wins. If two or more players do not fold, the game progresses to a next round (S7).

(S7) The dealer adds one community card (this is called "turn"). As in the case of the three community cards, the players perform an operation for betting or the like. If two or more players do not fold, the game progresses to a next round (S8).

(S8) The dealer places a final fifth community card (this is called "river"). As in the case of the three or four community cards, the players perform an operation for betting or the like.

(S9) If two or more players do not fold when the final round is completed, hands of the remaining players are disclosed (this is called "showdown"). This disclosing processing is also displayed on the screen of the user terminal of each player through graphic processing. Then, a winner is a player who makes a highest poker hand using five of the seven cards in total. The winner acquires all of a pot (a sum of the chips bet by the players). However, if there are two or more winners, the pot is divided equally and given to the winners respectively. In the embodiment of the present invention, the distributed chips are updated and managed for each user (player) on the management server.

(S10) Game processing is continued as described above, players who have no chips left drop out of the game, and a player who remains at the end can be made a winner. In the embodiment of the present invention, the results, including information on the proceeding of the game, are recorded and managed on the management server.

When a user (player) desires to finish playing and causes the gaming server to stop service provision after enjoying the card game several times, a stop request is transmitted from the user terminal to the gaming server (step S512 at time t8).

(Virtual Money Management Processing)

The virtual money management system according to the embodiment of the present invention performs game allocation processing and game proceeding processing as described above. However, more significant characteristics of the present invention pertain to virtual money management processing performed between games (that is, before a game is started, after the game is finished and before a next game is started, and the like) and during a game. The concrete characteristics are as follows.

(1) A plurality of types of virtual money can be managed for each user.

(2) At least one of the plurality of types of virtual money can be acquired through purchase or reward for something.

(3) A plurality of games are operated, and virtual money to be bet varies from game to game.

(4) Two-way or one-way exchange processing between the plurality of types of virtual money and management thereof are performed.
(5) The plurality of types of virtual money include: (5A) those distributed based on rules of a game; and (5B) those granted based on rankings resulted from a game (or rankings of results in a tournament or a game event), irrespective of rules of a game.
(6) For the virtual money granted in (5B) described above, redemption processing can be additionally performed as necessary.

In the system according to the embodiment of the present invention, it is assumed that virtual money as listed in a table below is managed as the plurality of types of virtual money.

TABLE 3

| Type of virtual money | Abbreviation | Acquisition example | Usage example |
|---|---|---|---|
| Point | P | Purchasing, or reward for mission achievement, friend invitation, and the like | Bet in ordinary games |
| Chip | C | Exchange with points P | Bet in tournament games other than ordinary games |
| Gold | G | Winning high rankings in tournament games | Redeemed for another type of virtual money or the like, transferred to another player or the like |

In the system according to the embodiment of the present invention, management of the virtual money in the above table for each user (player) (which virtual money and how much thereof each user possesses at a current point of time) can be performed by the management server or the like by using a table as follows.

TABLE 4

| Membership number (ID) | Number of points in possession | Number of chips in possession | Number of gold in possession |
|---|---|---|---|

The table shown above is used by being appropriately linked with the already-described profile information on users and the like as necessary.

Next, a description will be given of management processing in the virtual money management system according to the embodiment of the present invention, with reference to FIG. 6.

Figure 6:
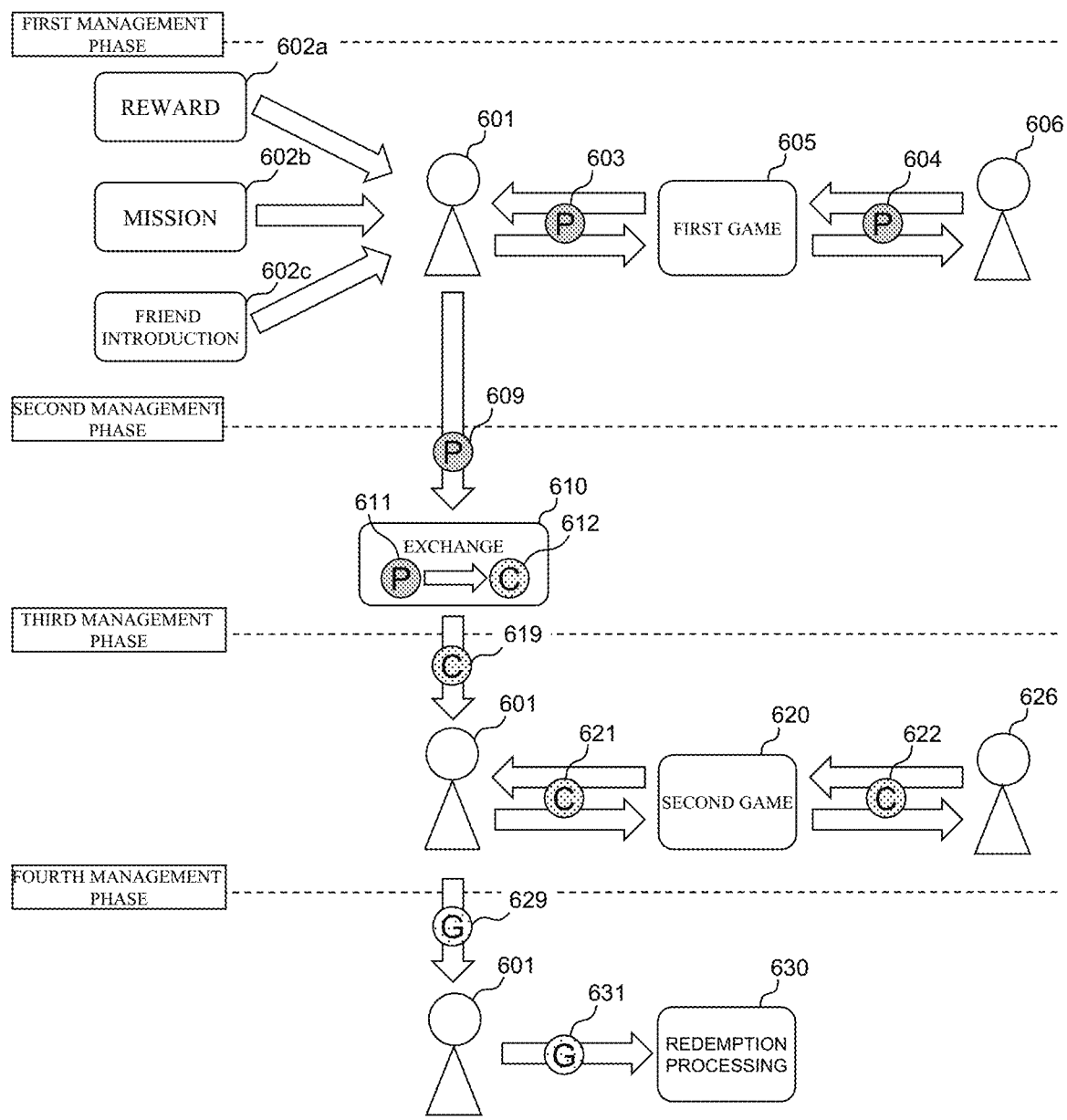
FIG. 6 is an explanatory diagram for explaining an example of management processing in the virtual money management system according to the embodiment of the present invention.

As shown in FIG. 6, the virtual money management system according to the embodiment of the present invention can be divided into following four first to fourth management phases when attention is focused on a player (user) 601 and a flow of virtual money transacted by him/her is traced.

[First Management Phase]

The first management phase is a phase in which the player 601 acquires virtual money P (points) and uses (that is, bets) the virtual money P to play a first game (ordinary game). In this phase, the player 601 acquires points derived from various rewards 602a (for example, points rewarded for logging in to a system, answering a simple questionnaire, and the like), points derived from missions 602b (for example, points rewarded for solving a quiz given by a system, and accomplishing a quest), and points derived from friend introduction 603c (for example, points rewarded for introducing a friend on SNS to a game service operated by the virtual money management system, and the like) by using their own user terminal through system services that are not limited to those of the virtual money management system according to the embodiment of the present invention. The player 601 bets the acquired points 603 and participates in a first game 605 (typically, a card game ordinarily operated, which will be described in detail later) operated by the virtual money management system according to the embodiment of the present invention.

On the other hand, in this phase, a player 606, similarly to the player 601, also purchases or acquires points through system services that are not limited to those of the virtual money management system according to the embodiment of the present invention by using their own user terminal, and participates in the first game 605 by betting the acquired points 604.

The virtual money management system according to the embodiment of the present invention can also allow other players (not shown) than the players 601 and 606 to bet purchased or acquired points and participate in the first game 605. Access of the plurality of players to the system (for example, the matching server and the gaming server), player matching, and a real-time proceeding of the multiplayer game are as described already with reference to FIG. 5.

In FIG. 6, the player 601 who has enjoyed playing the first game 605 and transacted points with the other player takes partial or all points 609 out of the points in possession (specifically, through an operation on a screen of the user terminal), and moves to the second management phase.

[Second Management Phase]

The second management phase is a phase in which the user terminal shifts to another screen (not shown) or the like, on which an operation is made to perform processing for exchanges between the plurality of types of virtual money. In this phase, the player 601 exchanges part or all (points 611 in FIG. 6) of the points in possession managed on the management system with chips 612 through processing 610 on the management system.

At this time, an arbitrary exchange rate (no matter whether the rate is a fixed rate or a variable rate) can be set between the points and the chips. The player 601 who has acquired the chips 612 through the virtual money exchange operation in the second management phase takes partial or all chips 619 out of the chips in possession (specifically, through an operation on the screen of the user terminal), and moves to the third management phase.

[Third Management Phase]

The third management phase is a phase in which the player 601 enjoys a second game (tournament game) by betting virtual money C (chips). In this phase, the player 601 bets chips 621 in possession and participates in the second game 620 (typically, a plurality of rounds of a card game or the like that are operated as a tournament, which will be described in detail later) operated by the virtual money management system according to the embodiment of the present invention, by using their own user terminal.

On the other hand, in this phase, a player 626 also bets chips 622 in possession and participates in the second game 620 by using their own user terminal, similarly to the player 601.

The virtual money management system according to the embodiment of the present invention can also allow other players (not shown) than the players 601 and 626 to bet chips in possession and participate in the second game 620. Access of the plurality of players to the system (for example, the matching server and the gaming server), player matching, and a real-time proceeding of the multiplayer game are as described already with reference to FIG. 5.

In FIG. 6, the player 601 who has enjoyed playing the second game 620 and transacted chips with the other player takes partial or all chips 629 out of virtual money G (gold) granted based on a ranking in the second game 620 (the ranking may be a ranking in each individual game, or may be a ranking of a result in the tournament or the game event based on a total record throughout a plurality of games) (specifically, through an operation on the screen of the user terminal), and moves to the fourth management phase.

[Fourth Management Phase]

The fourth management phase is a phase in which the user terminal shifts to another screen (not shown) or the like, on which an operation is made to perform redemption of virtual money. In this phase, processing is performed for the player 601 to redeem part or all (chips 631 in FIG. 6) of the chips in possession managed on the management system through processing 630 on the management system or on another system coordinating with the management system. This redemption processing includes processing for redemption for another type of virtual money or the like, and processing for transfer to another player or the like. Note that a rate used at the time of transfer in redemption is appropriately determined.

Figure 7:
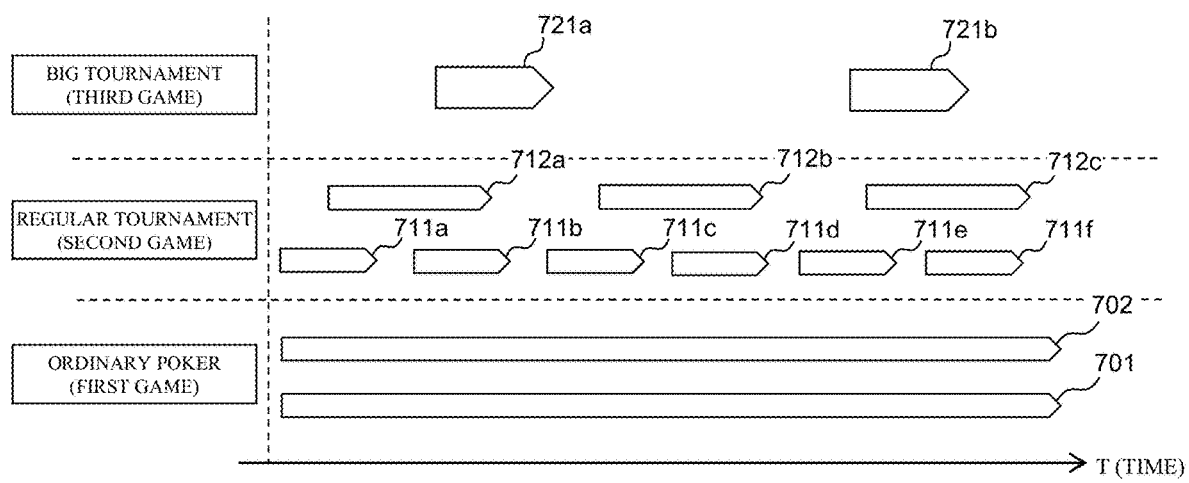
FIG. 7 is an explanatory diagram for explaining an example of game operation processing in the virtual money management system according to the embodiment of the present invention.

FIG. 7 shows an example of game operation processing in the virtual money management system according to the embodiment of the present invention. As shown in FIG. 7, the virtual money management system according to the embodiment of the present invention broadly operates "ordinary poker" as a first game, a "regular tournament" as a second game, and a "big tournament" as a third game. In FIG. 6, the first game is the "ordinary poker" and the second game is the "tournament game", while in FIG. 7, the tournament game is further broken down.

For each individual game played in the first game to the third game in FIG. 7, a card game of "Texas hold 'em" type as described above as an example can be employed. However, the present invention is not limited to this. Another type of card game or another game other than card games may also be employed.

FIG. 7 shows as an example in which the "ordinary poker (each individual game is a card game of "Texas hold 'em" type as an example)", which is always held, the "regular tournament (each individual game is a card game of "Texas hold 'em" type as an example)", which is held for a limited time period at a relatively short interval, and the "big tournament (each individual game is a card game of "Texas hold 'em" type as an example)", which is held for a limited time period with relatively little frequency, are operated in parallel.

More specifically, in FIG. 7, ordinary pokers 701 and 702 as the first games are always held, and each player accessing or logging in to the virtual money management system according to the embodiment of the present invention has an opportunity to participate in these always held games through a menu screen (not shown) or an introduction screen (not shown). When a plurality of matching players are collected, each game involving betting by each player proceeds in accordance with operations of the system (specifically, as described already with reference to FIGS. 5 and 6).

As described above, in the virtual money management system according to the embodiment of the present invention, for example, a plurality of types of the first games requiring different participation qualifications can be operated at the same time (a specific example of an embodiment of operating individual games requiring different participation qualifications will be described later).

Moreover, in FIG. 7, two types of regular tournaments 711 and 712 as the second games are held regularly or irregularly (as an example, for the regular tournament 711, 711*a* to 711*f* are held at relatively short intervals, and for the regular tournament 712, 712*a* to 712*c* are held at relatively long intervals), and each player accessing or logging in to the virtual money management system according to the embodiment of the present invention has an opportunity to participate in these tournament games through an announcement screen (not shown) or a guidance screen (not shown). When a plurality of matching players are collected, each game involving betting by each player proceeds in accordance with operations of the system (specifically, as described already with reference to FIGS. 5 and 6).

As described above, in the virtual money management system according to the embodiment of the present invention, for example, a plurality of types of the second games requiring different participation qualifications can be operated at the same time (a specific example of an embodiment of operating individual games requiring different participation qualifications will be described later).

Further, in FIG. 7, big tournaments 721*a* and 721*b* of one type as the third games are held regularly or irregularly, and each player accessing or logging in to the virtual money management system according to the embodiment of the present invention has an opportunity to participate in the tournament games through an announcement screen (not shown) or a guidance screen (not shown). The present invention is of course not limited to this, and a plurality of types of big tournaments can be operated similarly to the above-described regular tournaments.

Next, a description will be given of display examples on the information processing apparatus (user terminal) in the virtual money management system according to the embodiment of the present invention, with reference to FIGS. 8 to 12.

Figure 8:
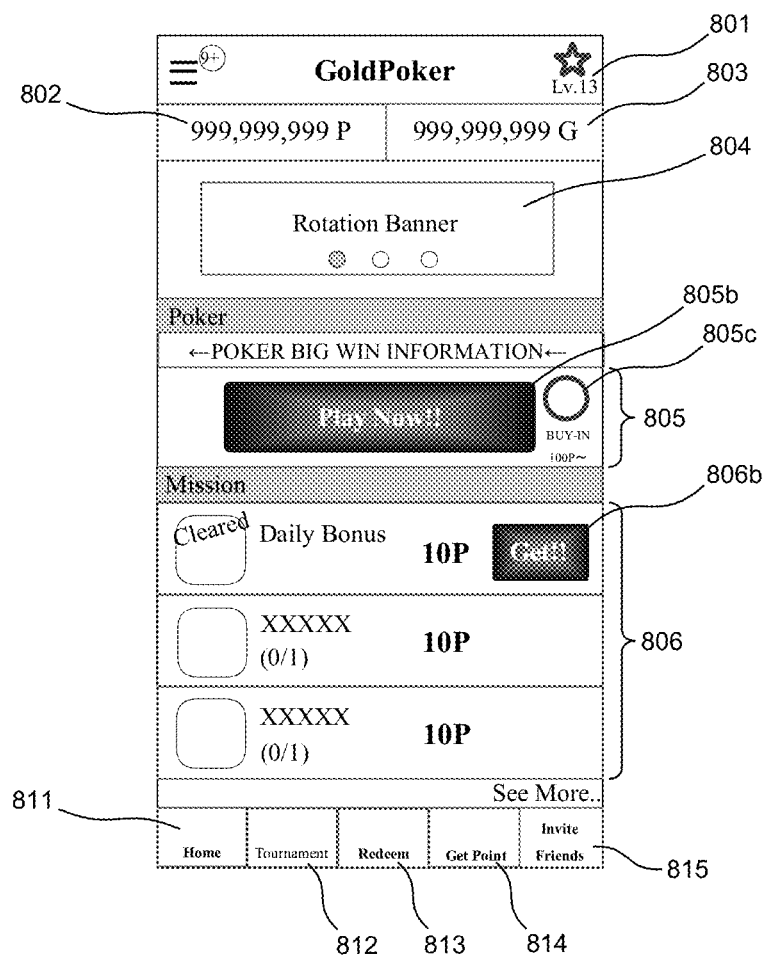
FIG. 8 is an explanatory diagram for explaining a display example on the information processing apparatus in the virtual money management system according to the embodiment of the present invention.

FIG. 8 shows an example of a home screen on the user terminal accessing or logging in to the virtual money management system according to the embodiment of the present invention. In FIG. 8, a level display field 801 for displaying acquired chips and the like and a level of the player determined based on a game result record, a possessed money display field 802 for displaying points possessed by the player, a possessed money display field 803 for displaying possessed gold (a possessed money field for displaying possessed chips (not shown) may also be provided), and a rotation banner or display area 804 for displaying an announcement of a tournament or the like and an advertisement are displayed in an upper portion of a home screen 800.

In a middle portion of the home screen 800, an ordinary poker entry operation area 805 is provided, which offers an opportunity to participate in a typical game, and the player can participate in ordinary poker by pressing a participation button 805*b*. However, since the player needs to possess points for participation, the player can shift to a purchase screen (not shown) by pressing a point purchase button 805*c* and purchase as many points as required if the player possesses no points or is short of points.

A display field 806 for point presents that can be acquired not through purchasing but through mission achievement and the like, which serve as point acquisition means, is displayed in a lower portion of the home screen 800. In an uppermost portion of the display field 806, it is displayed as an example that 10 points can be acquired as a present by making a daily login, and the player can acquire this present by pressing an acquisition button 806b.

In a lowermost portion of the home screen 800, various menu buttons are displayed as examples. A button 811 is a home button to return to the home screen, a button 812 is a shift button to shift to another screen for viewing a situation of a tournament that is being held or will be held (which will be described later with reference to FIG. 9), a button 813 is a shift button to shift to a screen where acquired virtual money (for example, gold) is redeemed, a button 814 is a shift button to shift to a screen (not shown) where virtual money (for example, points) is purchased and/or acquired through a method other than purchasing, and a button 815 is a shift button to shift to a screen (not shown) where the player invites a friend of the player.

Figure 9:
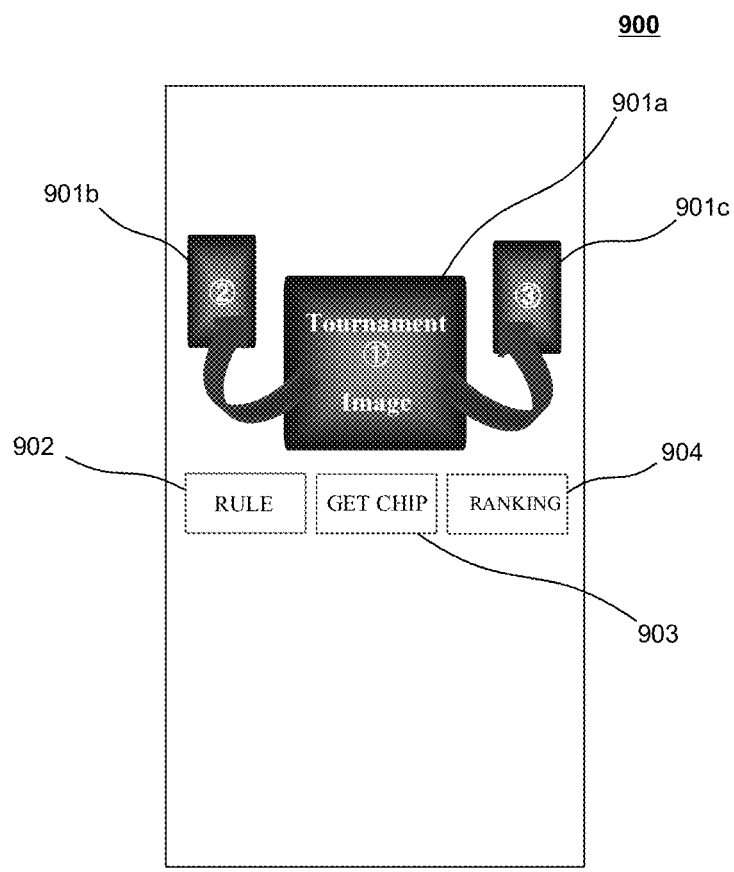
FIG. 9 is an explanatory diagram for explaining another display example on the information processing apparatus in the virtual money management system according to the embodiment of the present invention.

FIG. 9 shows another screen example on the user terminal receiving the service from the virtual money management system according to the embodiment of the present invention, which is a screen example for viewing information on a tournament operated on the system. It is possible to shift to the screen shown in FIG. 9, for example, by pressing the button 812 shown in FIG. 8, although the present invention is not limited to this.

Referring to FIG. 9, a screen 900 includes a display area where a tournament or a game event that is being held (or will be held) can be switched to Skype format. In FIG. 9, tournament guidance displays 901a to 903c are displayed as an example. When only one tournament or game event is being held (or will be held), a guidance display is a fixed display (for example, only 901a).

Moreover, in FIG. 9, a button 902 is a button to shift to a screen (not shown) for seeing rules of the game event on the guidance display 901a displayed in front, a button 903 is a shift button to shift to a screen for acquiring chips required for the tournament or the game event (which will be described later with reference to FIG. 12), and a button 904 is a button to shift to a screen (not shown) for seeing interim rankings in the game event on the guidance display 901a displayed in front.

Figure 10:
FIG. 10 is an explanatory diagram for explaining another display example on the information processing apparatus in the virtual money management system according to the embodiment of the present invention.

FIG. 10 shows another screen example on the user terminal receiving the service from the virtual money management system according to the embodiment of the present invention, which is a screen example for making an entry into a tournament operated on the system. It is possible to shift to a screen 1000 shown in FIG. 10, for example, by pressing the guidance display 901a shown in FIG. 9, although the present invention is not limited to this.

In the screen 1000 of FIG. 10, an announcement display 1001 announces that a reward value for the first ranking in this tournament is 10000000 gold. It is possible to shift to a rule explanation screen (not shown) by pressing a button 1002 and check rules.

Since chips to bet are required to participate in this tournament, the player shifts to the screen for acquiring chips (which will be described later with reference to FIG. 12) by pressing a button 1003 in order to acquire required chips. To see interim rankings in this tournament, the player shifts to the screen (not shown) for seeing rankings by pressing a button 1004.

To participate in this tournament, the player shifts to a play screen (not shown) by pressing a button 1005. In a guidance area 1006, chips (or points) currently acquired by the player and chips (or points) to be acquired necessary to increase ranking by one place are displayed.

Figure 11:
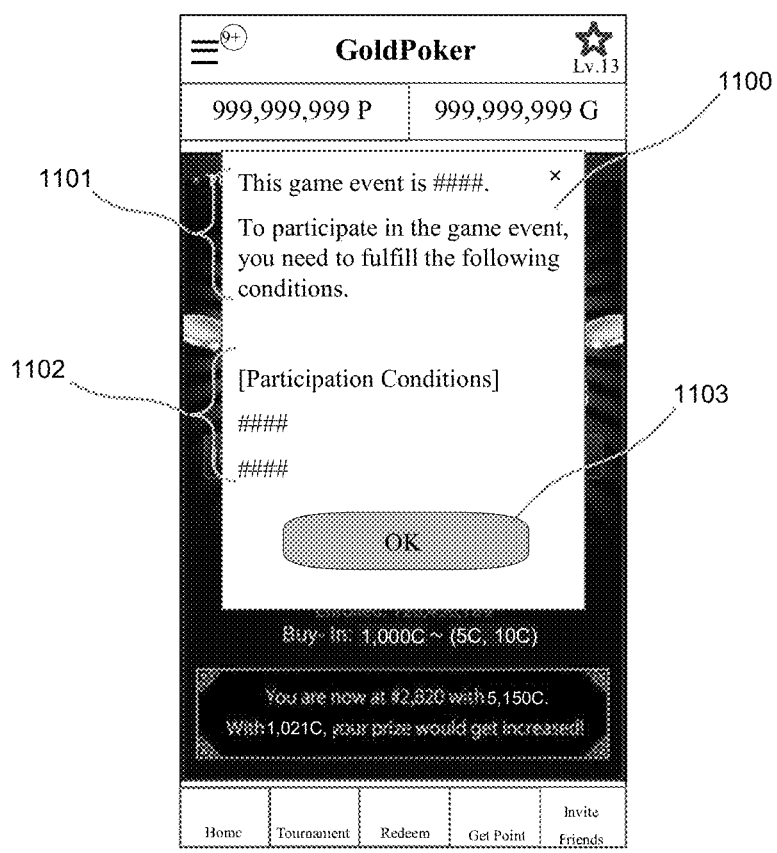
FIG. 11 is an explanatory diagram for explaining another display example on the information processing apparatus in the virtual money management system according to the embodiment of the present invention.

FIG. 11 shows another screen example on the user terminal receiving the service from the virtual money management system according to the embodiment of the present invention, which is an example of a confirmation pop-up appearing when the player participates in a tournament. A pop-up 1100 shown in FIG. 11 is popped up, for example, by pressing the button 1005 shown in FIG. 10, although the present invention is not limited to this.

The pop-up 1100 of FIG. 11 presents an announcement 1101 that this game event (tournament) imposes participation conditions and participation is not allowed unless these conditions are fulfilled, and the participation conditions 1102.

The player checks the participation conditions and, if accepting, presses an OK button 1103 so as to participate in the game event.

Figure 12:
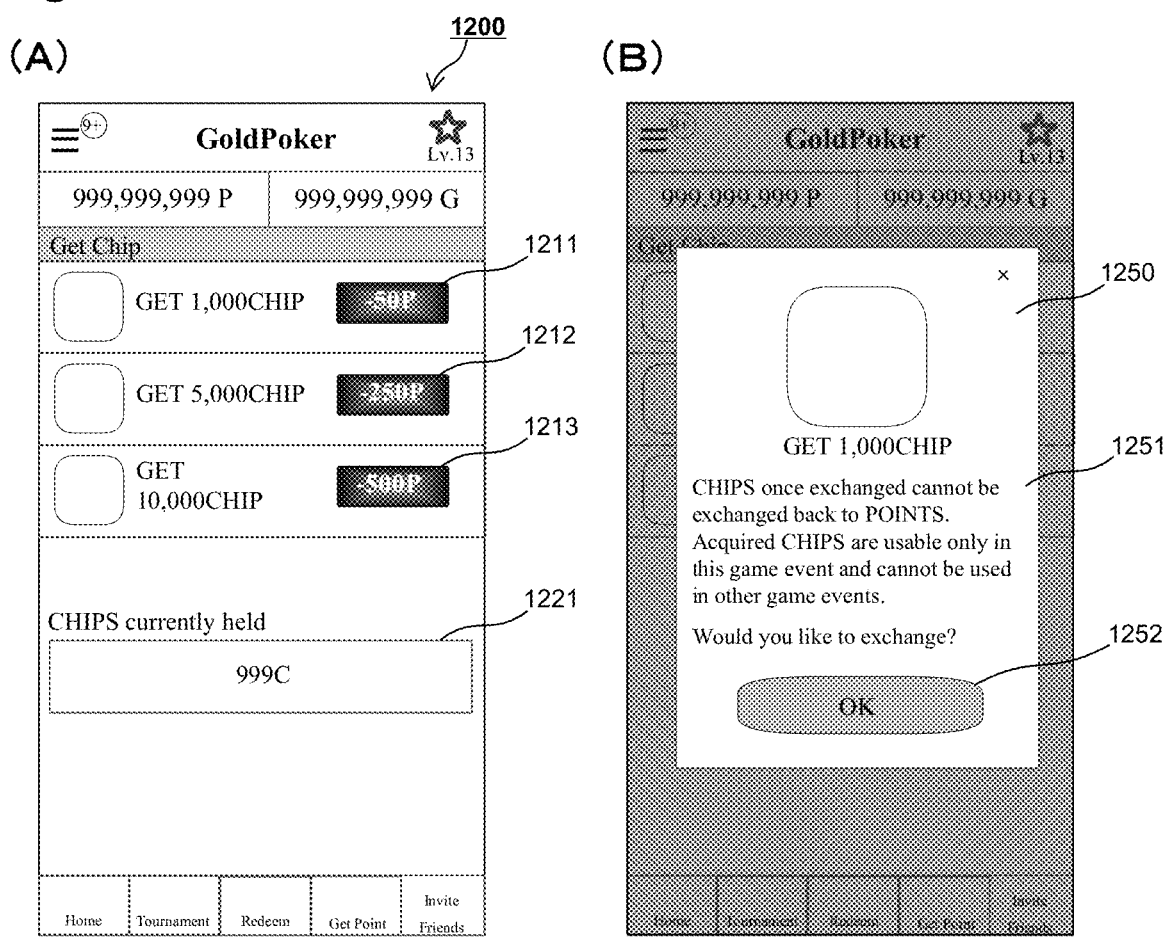
FIG. 12 is an explanatory diagram for explaining other display examples on the information processing apparatus in the virtual money management system according to the embodiment of the present invention.

FIG. 12 shows other screen examples on the user terminal receiving the service from the virtual money management system according to the embodiment of the present invention. FIG. 12(A) shows a screen example for acquiring chips by using points in possession. It is possible to shift to a screen 1200 shown in FIG. 12(A), for example, by pressing the button 903 shown in FIG. 9, although the present invention is not limited to this.

In an upper portion of the screen 1200 of FIG. 12(A), points to be paid for each desired value of chips are displayed, and a display on a first line indicates that 1000 chips can be acquired by paying 50 points ("−50P" is displayed in FIG. 12(A)). The rate is 20 points per chip. If the player wishes to carry out this exchange, the player presses a button 1211.

A display on a second line indicates that 5000 chips can be acquired by paying 250 points ("−250P" is displayed in FIG. 12(A)). If the player wishes to carry out this exchange, the player presses a button 1212. Similarly, a display on a third line indicates that 10000 chips can be acquired by paying 500 points ("−500P" is displayed in FIG. 12(A)). If the player wishes to carry out this exchange, the player presses a button 1213.

The exchange rate may be variable depending on the number of chips exchanged. For example, although the rate in acquiring chips is commonly 20 points per chip in FIG. 12(A), an arbitrary setting may be made such that the rate in acquiring 5000 chips is 23 points per chip (fractions are appropriately treated such as being rounded down), and the rate in acquiring 10000 chips is 25 points per chip, and the like.

In a lower portion of FIG. 12(A), the number of chips currently possessed by the player (999C in FIG. 12(A)) is displayed. When chips are increased by exchange, the terminal and/or the system is controlled so that an increased value is displayed in real time.

FIG. 12(B) shows another screen example on the user terminal receiving the service from the virtual money management system according to the embodiment of the present invention, which is an example of a confirmation pop-up as an option appearing when the player intends to acquire chips in FIG. 12(A) (that is, when the player presses any one of the buttons 1211 to 1213). In the embodiment of the present invention, control and management are performed such that even if exchange from points to chips can be carried out, re-exchange from chips to points cannot be made. Accordingly, an example of a pop-up to allow the player to confirm this matter is shown in FIG. 12(B).

In FIG. 12(B), a pop-up 1250 displays a guidance 1251 announcing that chips once exchanged cannot be re-exchanged with points. The player who accepts this can carry out the exchange by pressing an OK button 1252.

Application Example 1

Various Participation Qualifications

In the foregoing description, the presence of "participation qualifications" to participate in a game or a tournament is mentioned in some occasions. In the embodiment of the present invention, various participation qualifications and game event conditions can be set as those in a table below.

TABLE 5

| Name of game event (tournament) (Provisional name) | Qualification for participation in game event (tournament) or game event condition | Applicable game/game event/tournament type |
|---|---|---|
| Regular Tournament | All players (all users) possessing virtual money to bet can participate | Regular |
| Big Tournament | All players (all users) possessing virtual money to bet can participate | Big |
| High roller | All players (all users) possessing virtual money to bet can participate, provided, however, that a higher exchange rate of points to chips and a larger bet unit in a game are set | Regular/ Big |
| Level limitation | Players (users) at or above a certain level (or at or below a certain level, or at a level within a certain range) can participate | Regular/ Big |
| No continue | The number of exchanges from points to chips is limited (e.g., only one time or the like) | Regular/ Big |
| Aim at nice round numbers! | All players (all users) possessing virtual money to bet can participate, and higher rewards are set for those who win nice-round-number (numbers with no odd) rankings in the game event | Regular/ Big |

Application Example 2

Coordination of Advertisement and Reward Value According to Ranking in Game

In the embodiment of the present invention, for example, the display area 804 in FIG. 8 is configured to display an advertisement. In another embodiment of the present invention, operation is possible in which the number of views of this advertisement (a conventional technique can be used for the system or the management server to count the number of views) is associated with a reward value based on a raking in a game or a tournament (the reward value corresponds to first prize money or the like adopted in a general professional competition or the like, and in the embodiment of the present invention, corresponds to gold, chips, or points), and the reward value is sequentially updated to be increased as the number of views of the advertisement provided for the game or the tournament rises. As an example, such updating and management are performed by, for example, the management server based on a table as shown below.

TABLE 6

| Number of views of advertisement | Reward value for first ranking |
|---|---|
| 0-10000 | 10000 gold (chips) |
| 10001-100000 | 50000 gold (chips) |
| 100001-1000000 | 100000 gold (chips) |
| 1000001 and more | 1000000 gold (chips) |

Although the above table only illustrates reward values for the first ranking (highest values) as an example, in another embodiment of the present invention, reward values for the second and lower rankings are also appropriately arranged.

Moreover, in another embodiment of the present invention, management and control can also be performed such that the reward value varies with the size of an advertisement displayed (the size of a display area on a screen). For example, such management and control are performed by the management server or the like based on a table as shown below.

TABLE 7

| Size of advertisement | Reward value for first ranking |
|---|---|
| Single unit | 10000 gold (chips) |
| Double unit | 20000 gold (chips) |
| Triple unit | 30000 gold (chips) |
| Max unit | 50000 gold (chips) |

Note that "Single unit" in the above table refers to a defined display area on a screen (an arbitrary resolution can be used), and "Double unit" and "Triple unit" refer to a twofold display area and a threefold display area, respectively. Further, "Max unit" is assumed to refer to a display area five times the display area of the "Single unit" as an example.

In still another embodiment of the present invention, operation and control is also possible in which the reward value is increased with a cumulative sum of viewing time spent on an advertisement (typically, a video advertisement) displayed on a screen. For example, viewing time spent when a video advertisement is viewed is managed by the management server or the like each time, total viewing time spent on the video advertisement by a plurality of users is updated and monitored, and a value obtained by multiplying the total viewing time by an arbitrary coefficient can be used for the reward value for the first ranking.

In even still another embodiment of the present invention, management and operation can be performed such that with respect to viewing of an advertisement, counting views or measuring viewing time is not stopped when a game event is started, but is continued after the game event is started. By continuing counting views or the like of the advertisement even after the game event is started in this manner, a top-up on the reward value can be made according to a rise in popularity after the game event is started (views of the advertisement are also expected to increase), whereby the more enjoyable and interesting game event can be operated.

Application Example 3

Virtual Money Management on Server Side to Prevent Fraud

In the foregoing description, the characteristic processing operations of the present invention are implemented mainly through coordination of the management server (which manages virtual money) and the gaming server (which manages and operates a game) in the information processing server group. However, it is also described that at least part of the executable processing routines may be performed by another information processing server, another information processing apparatus, and the like in some cases. To prevent frauds by malicious players such as unauthorized access and data falsification, data on players (possessed values of various types of virtual money and the like) is collectively managed by the management server, whereby robustness of the system according to the present invention is further enhanced.

Application Example 4

Example (1) of Detailed Flow of Virtual Money Management in Game Proceeding

In the foregoing description, it is mentioned that there are a plurality of types of game proceedings (ordinary game, and tournament or game event). Here, a description will be given of an example of a detailed operation flow in terms of virtual money management in an "ordinary game", with reference to FIG. 13. Note that in a flow shown in FIG. 13, it is assumed that player matching processing is already completed.

Figure 13:
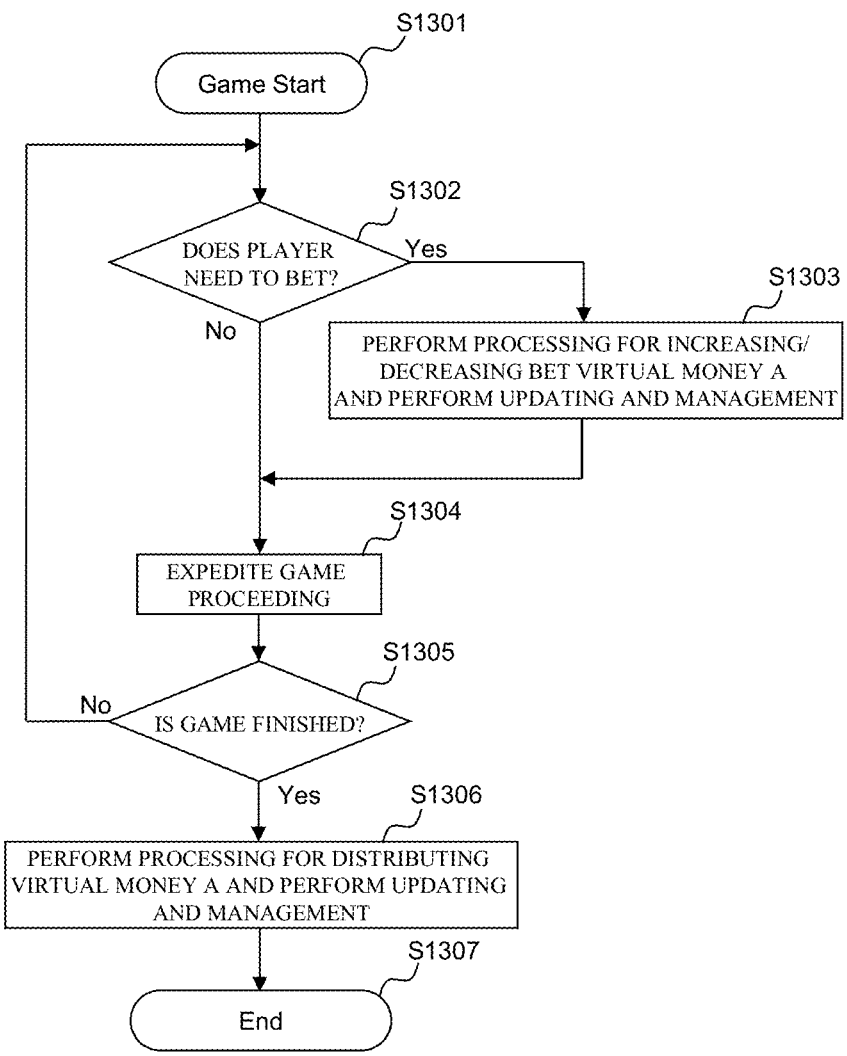
FIG. 13 is a flowchart for explaining operations of the virtual money management system and the like according to the embodiment of the present invention.

In FIG. 13, when a game is started in step S1301, the processing advances to step S1302, where the gaming server determines whether or not a player needs to bet in a proceeding of the game (step S1302). When the player does (Yes), the processing advances to step S1303, where processing for increasing or decreasing bet virtual money A is performed (while the gaming server prompts the user terminal to make a bet when necessary), and updating and management of a virtual money value and the like possessed by each player are performed.

In case of No in step S1302, game proceeding processing (as an example, steps as illustrated in (S1) to (S10) if a proceeding of "Texas hold 'em" is expedited) is performed to advance to step S1305.

In step S1305, it is determined whether or not the game is finished. In case of No, the processing goes back to step S1302. In case of Yes, the processing advances to step S1306, where the management server performs processing for distributing virtual money bet in the game to each player when the game is finished, and performs updating and management of a virtual money value and the like possessed by each player (step S1306). Then, the processing advances to step S1307 to terminate the game.

Application Example 5

Example (2) of Detailed Flow of Virtual Money Management in Game Proceeding

Here, a description will be given of an example of a detailed operation flow in terms of virtual money management in a "tournament or game" of the plurality of types of games (ordinary game, and tournament or game event), with reference to FIG. 14.

In FIG. 14, when operation of a tournament is started in step S1401, the processing advances to step S1402, where reward values based on rakings in the game or the tournament are determined in accordance with the number of views by users of an advertisement (as an example, an advertisement content displayed in the rotation banner or display area 804 in FIG. 8) provided to the tournament.

In step S1403, it is determined by the gaming server or the like whether or not the tournament is finished. In case of No, the processing advances to step S1404, where processing for a proceeding of each individual game (matching processing and the game proceeding described with reference to FIG. 13) is performed. Then, the processing advances to step S1405, where the management server performs counting processing for rankings based on values of virtual money (here, virtual money A) in possession when the individual games are finished so as to compute rankings of participating players in the tournament, and performs updating and management.

In case of Yes in step S1403, since the tournament is finished, the processing advances to step S1406, where the management server computes rankings in the tournament based on values of the virtual money A in possession or total records of individual game results when the tournament is finished, and performs updating processing.

Then, the processing advances to step S1407, where the management server performs processing for granting reward values (typically, virtual money B different from the virtual money A is granted) based on the updated rankings in the tournament, and performs updating and management of money values and the like possessed by each player.

Note that although in step S1402, reward values are determined based on the number of views of the advertisement or the like made until the tournament is started, the present invention is not limited to this. Operation is also possible in which counting of the number of views of the advertisement or frequency of viewing the advertisement is continued until the tournament is finished, and the reward values are increased with an increased in the number of counts so that rewards according to rankings are granted in accordance with the then reward values when the tournament is finished. According to such operation, dynamic reward values adequate for a rise in popularity along a proceeding of the tournament (which is thought to be proportional to the number of views of the advertisement) can be adopted, and such operation is more preferable.

Hereinabove, embodiments of the virtual money management system, the method, the program, and the like are described based on concrete examples. In addition to the method or the program for implementing the system or the apparatuses, embodiments of the present invention may take forms of recording media (as examples, an optical disk, a magneto-optical disk, a CD-ROM, a CD-R, a CD-RW, a magnetic tape, a hard disk, and a memory card) and the like recording the program.

For embodiments of implementing the program, the program is not limited to application programs such as object code compiled by a compiler and program code executed by an interpreter, but may be a program module and the like embedded in an operating system.

Further, all processing involved in the program does not necessarily need to be performed only by a CPU on a control board. A configuration is also possible in which part or all of the processing is performed by another processing unit (DSP or the like) mounted on an expansion board or an expansion unit added to the board as necessary.

All of the constituent elements described in the present Description (including Claims, Abstract, and Drawings) and/or all of the steps in all of the methods or the processing disclosed can be combined with each other arbitrarily, excluding combinations in which features of the constituent elements and the like are contradictory to each other.

Moreover, each of the features described in the present Description (including Claims, Abstract, and Drawings) can be replaced by a substituent feature that acts for a same, equivalent, or similar purpose, unless explicitly denied. Accordingly, each of the disclosed features is merely an example of a series of comprehensive same or uniform features, unless explicitly denied.

Further, the present invention is not limited to any specific configurations in the above-described embodiments. The present invention can be extended to include all new features or combinations thereof, or steps or combinations thereof in all new methods or processing, described in the present Description (including Claims, Abstract, and Drawings).

REFERENCE SIGNS LIST

10 Virtual money management system
11 Information processing server group
111 Game operation server group
15 Tablet terminal (an embodiment of information processing apparatus)
12, 13 PC (an embodiment of information processing apparatus)
14 Mobile telephone (an embodiment of information processing apparatus)
19 Public circuit (dedicated line, Internet, or the like)
21 Matching server (group)
22 Gaming server (group)
23 Management server (group)

The invention claimed is:

1. A virtual money management system comprising: a gaming server which can be accessed by a plurality of user terminals and controls a multiplayer game played by the plurality of user terminals accessing the gaming server; and a management server which manages virtual money bet in the multiplayer game,
wherein the gaming server operates a plurality of types of multiplayer games,
the management server
(A) manages different types of virtual money used in the plurality of types of multiplayer games, respectively,
(B) performs exchange processing for exchanging the different types of virtual money with each other, and
(C) in at least one type of multiplayer game among the plurality of types of multiplayer games, grants rewards to players based on reward values defined according to rankings in the game,
the plurality of types of multiplayer games include at least a specified type of card game and a tournament of the specified type of card game,
the different types of virtual money includes a first, virtual money used in the specified type of card game same and a second virtual money used in the tournament of the specified type of card game, and
the second virtual money used in the tournament of the specified type of card game is granted to the players using exchange processing in which the second virtual money is irreversibly exchanged from the first virtual money.

2. The system according to claim 1, wherein the specific type of card game is always held, and the tournament of the specific type of card game is held for a limited time period.

3. The system according to claim 1, wherein the system includes a function of displaying an advertisement content and is configured to count the number of views of the advertisement content, and
the management server determines the reward values defined according to the rankings in the one of the plurality of types of multiplayer games and granted to the users, based on the number of views of the advertisement content.

4. A virtual memory management method comprising:
causing a gaming server to operate a plurality of types of multiplayer games, the gaming server being accessed by a plurality of user terminals and controlling a multiplayer game played by the plurality of user terminals accessing the gaming server; and
causing a management server which manages virtual money bet in the multiplayer game to
(A) manage different types of virtual money used in the plurality of types of multiplayer games, respectively;
(B) perform exchange processing for exchanging the different types of virtual money with each other; and
(C) in at least one type of multiplayer game among the plurality of types of multiplayer games, grant rewards to players based on reward values defined according to rankings in the game, wherein
the plurality of types of multiplayer games include at least a specified type of card game and a tournament of the specified type of card game,
the different types of virtual money includes a first virtual money used in the specified type of card game and a second virtual money used in the tournament of the specified type of card game, and
the second virtual money used in the tournament of the specified type of card game is granted to the players using exchange processing in which the second virtual money is irreversibly exchanged from the first virtual money.

5. The method according to claim 4, wherein the specific type of card game is always held, and the tournament of the specific type of card game is held for a limited time period.

6. The method according to claim 4, further comprising:
displaying an advertisement content,
counting the number of views of the advertisement content, and
causing the management server to determine the reward values defined according to the rankings in the one of the plurality of types of multiplayer games and granted to the users, based on the number of views of the advertisement content.

* * * * *